(12) United States Patent
Muiruri (10) Patent No.: US 10,977,451 B2
(45) Date of Patent: Apr. 13, 2021

(54) LANGUAGE TRANSLATION SYSTEM

(71) Applicant: Benjamin Muiruri, Westford, MA (US)

(72) Inventor: Benjamin Muiruri, Westford, MA (US)

( * ) Notice: Subject to any disclaimer, the term of this patent is extended or adjusted under 35 U.S.C. 154(b) by 51 days.

(21) Appl. No.: 16/391,392

(22) Filed: Apr. 23, 2019

(65) Prior Publication Data
US 2020/0342062 A1    Oct. 29, 2020

(51) Int. Cl.
*G06F 40/58* (2020.01)
*G06F 3/16* (2006.01)
*G10L 13/00* (2006.01)
*G10L 15/18* (2013.01)

(52) U.S. Cl.
CPC .............. *G06F 40/58* (2020.01); *G06F 3/167* (2013.01); *G10L 13/00* (2013.01); *G10L 15/1822* (2013.01)

(58) Field of Classification Search
USPC .............. 704/1–504; 358/403; 716/103–105; 717/136–161
See application file for complete search history.

(56) References Cited

U.S. PATENT DOCUMENTS

| | | | |
|---|---|---|---|
| 8,825,468 B2 * | 9/2014 | Jacobsen | G06F 40/58 704/3 |
| D721,053 S | 1/2015 | Fujioka | |
| 9,507,772 B2 * | 11/2016 | Parkinson | G06F 40/58 |
| 9,672,210 B2 * | 6/2017 | Osterhout | G02B 27/0176 |
| 9,747,282 B1 * | 8/2017 | Baker | G10L 15/26 |
| 10,206,025 B2 * | 2/2019 | Koss | H04R 5/033 |
| 10,553,209 B2 * | 2/2020 | Gruber | G10L 15/22 |
| 2003/0065504 A1 * | 4/2003 | Kraemer | G06F 40/58 704/8 |
| 2005/0192811 A1 * | 9/2005 | Parks | G10L 15/26 704/277 |
| 2009/0099836 A1 * | 4/2009 | Jacobsen | G06F 40/58 704/3 |
| 2010/0185432 A1 * | 7/2010 | Almagro | H04R 5/033 704/2 |
| 2016/0283469 A1 * | 9/2016 | Gold | H04S 7/00 |

(Continued)

FOREIGN PATENT DOCUMENTS

WO    2013163293    10/2013

*Primary Examiner* — Marcus T Riley
(74) *Attorney, Agent, or Firm* — Kyle A. Fletcher, Esq.

(57) ABSTRACT

The language translation system comprises a headphone, a personal data device, and a communication link. The communication link exchanges data between the headphone and the personal data device. The headphone captures the audible data associated with a first natural language. The headphone transmits the captured audible data associated with the first natural language to the personal data device. The headphone translates the captured audible data associated with the first natural language into a second natural language. The headphones simultaneously repeat the audible data associated with the first natural language and announces a translation in the second natural language over a plurality of speakers. The personal data device receives the captured audible data associated with the first natural language and associates the captured audible data with visual data associated with the second natural language. The personal data device displays the associated visual data.

19 Claims, 4 Drawing Sheets

(56) References Cited

U.S. PATENT DOCUMENTS

| | | | |
|---|---|---|---|
| 2017/0039866 A1* | 2/2017 | Coffee | G09B 5/04 |
| 2018/0249240 A1* | 8/2018 | Koss | H03K 17/9622 |
| 2018/0300316 A1* | 10/2018 | Chissoe | G10L 13/00 |
| 2018/0322116 A1* | 11/2018 | Huang | G06F 3/04883 |
| 2019/0058784 A1* | 2/2019 | Truhill | H04M 1/6066 |

\* cited by examiner

LANGUAGE TRANSLATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics and electrical data processing including handling and processing natural language data, more specifically, a real-time language translation device. (G06F17/289)

SUMMARY OF INVENTION

The language translation system is a device. The language translation system comprises a headphone, a personal data device, and a communication link. The communication link exchanges data between the headphone and the personal data device. The headphone captures the audible data associated with a first natural language. The headphone transmits the captured audible data associated with the first natural language to the personal data device. The headphone translates the captured audible data associated with the first natural language into audible data associated with a second natural language. The headphones simultaneously announce the captured audible data associated with the first natural language and the translated audible data associated with the second natural language over a plurality of speakers. The personal data device receives the captured audible data associated with the first natural language and translates the captured audible data associated with the first natural language into visual data associated with the second natural language. The personal data device displays the visual data associated with the second natural language as an image of indicia that displays a sentiment associated with the visual data associated with the second natural language.

These together with additional objects, features and advantages of the language translation system will be readily apparent to those of ordinary skill in the art upon reading the following detailed description of the presently preferred, but nonetheless illustrative, embodiments when taken in conjunction with the accompanying drawings.

In this respect, before explaining the current embodiments of the language translation system in detail, it is to be understood that the language translation system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the language translation system.

It is therefore important that the claims be regarded as including such equivalent construction insofar as they do not depart from the spirit and scope of the language translation system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The language translation system 100 (hereinafter invention) is a device. The invention 100 comprises headphones 101, a personal data device 102, and a communication link 103. The communication link 103 exchanges data between the headphones 101 and the personal data device 102.

The headphones 101 capture the audible data associated with a first natural language. The headphones 101 transmit the captured audible data associated with the first natural language to the personal data device 102. The headphones 101 translate the captured audible data associated with the first natural language into audible data associated with a second natural language. The headphones 101 simultaneously announce the captured audible data associated with the first natural language and the translated audible data associated with the second natural language over a plurality of speakers 113.

The personal data device 102 receives the captured audible data associated with the first natural language and translates the captured audible data associated with the first natural language into visual data associated with the second natural language. The personal data device 102 displays the visual data associated with the second natural language as an image 152 of indicia that displays a sentiment associated with the visual data associated with the second natural language.

The headphones 101 is an electromechanical device. The headphones 101 capture audible data associated with the first natural language. The headphones 101 translate the captured audible data associated with the first natural language into audible data associated with the second natural language. The headphones 101 simultaneously announce the audible data associated with the first natural language and the audible data associated with the second natural language through a plurality of speakers 113. The headphones 101 transmit the audible data associated with the first natural language over the communication link 103 to the personal data device 102. The headphones 101 are worn by the client during the use of the invention 100. The headphones 101 comprise a first logic module 111, a first communication module 112, a plurality of speakers 113, a microphone 143, and a first housing 114.

Figure 1:
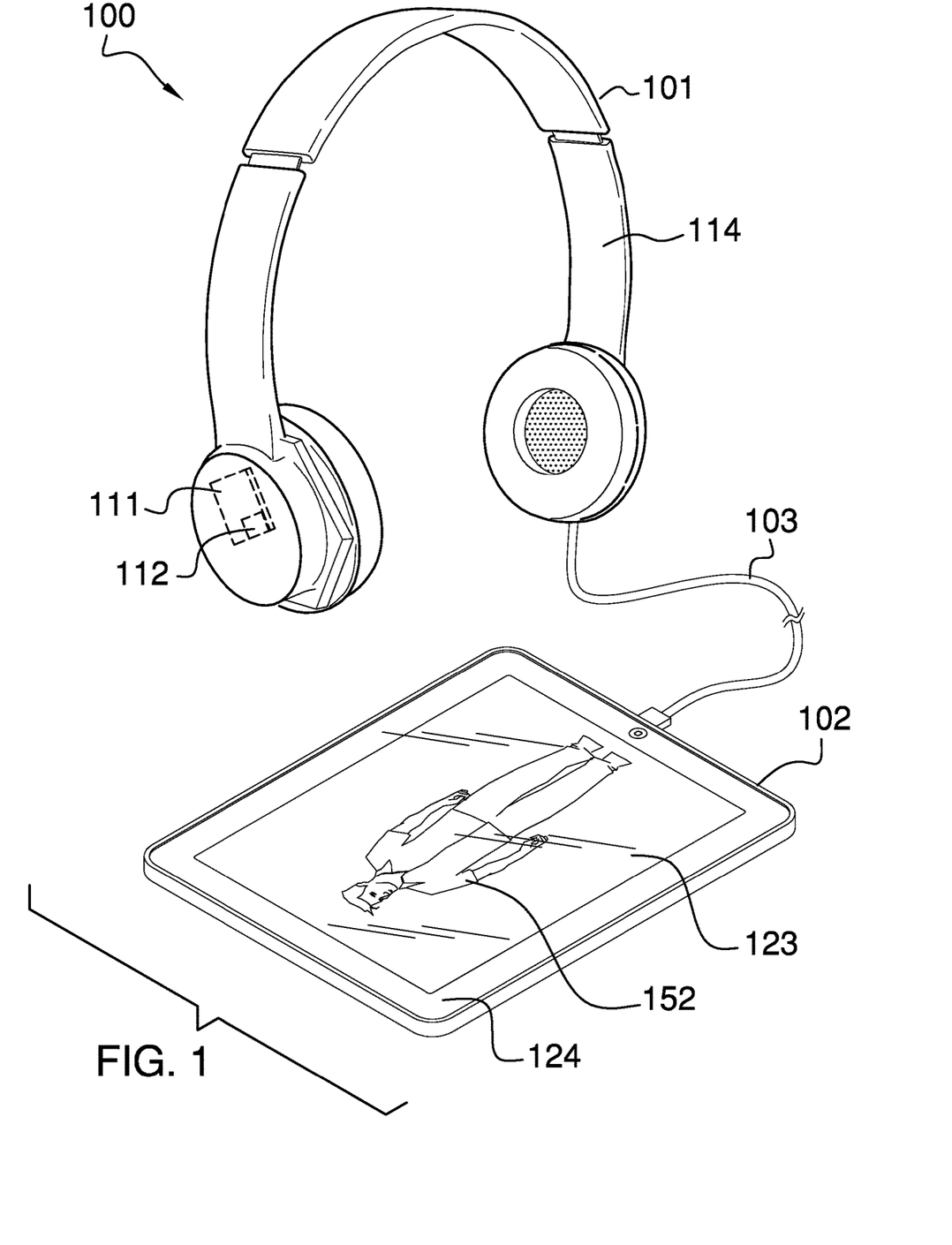
FIG. 1 is a perspective view of an embodiment of the disclosure.
Figure 2:
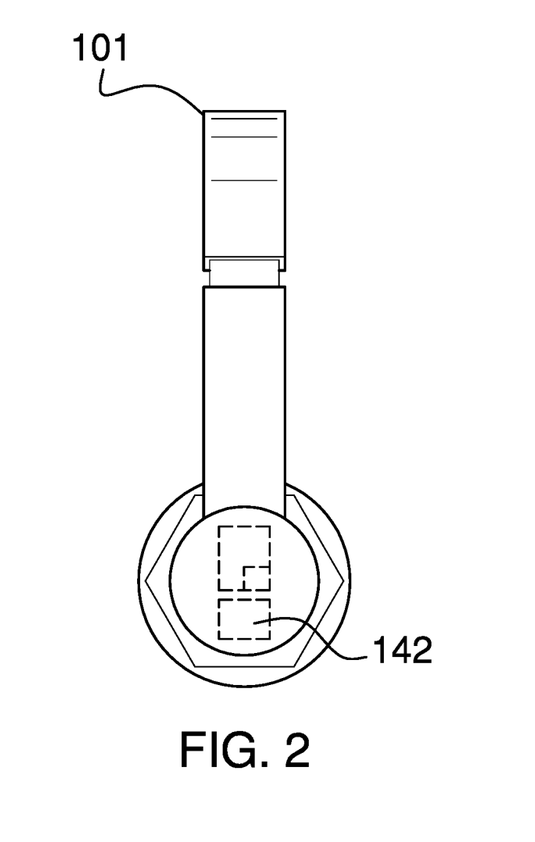
FIG. 2 is a side detail view of an embodiment of the disclosure.
Figure 3:
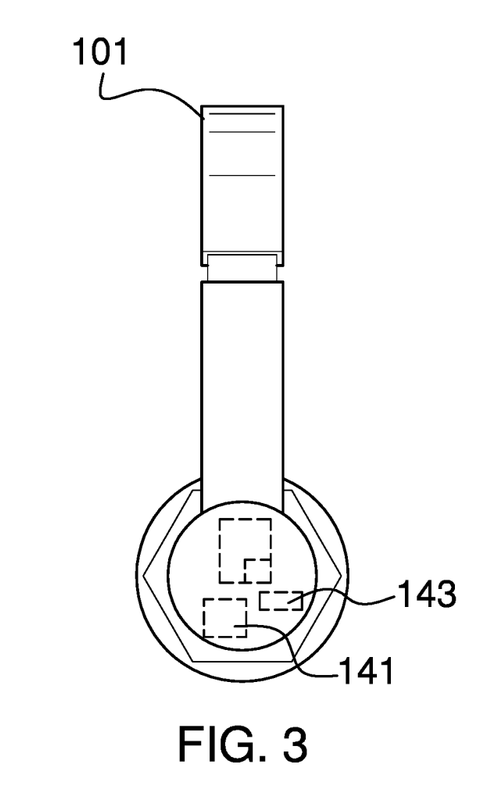
FIG. 3 is a reverse side detail view of an embodiment of the disclosure.
Figure 4:
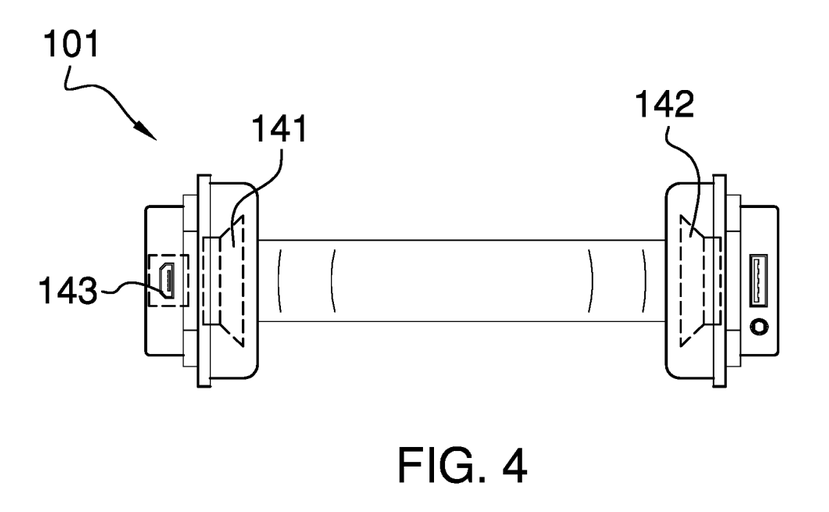
FIG. 4 is a bottom view of an embodiment of the disclosure.
Figure 5:
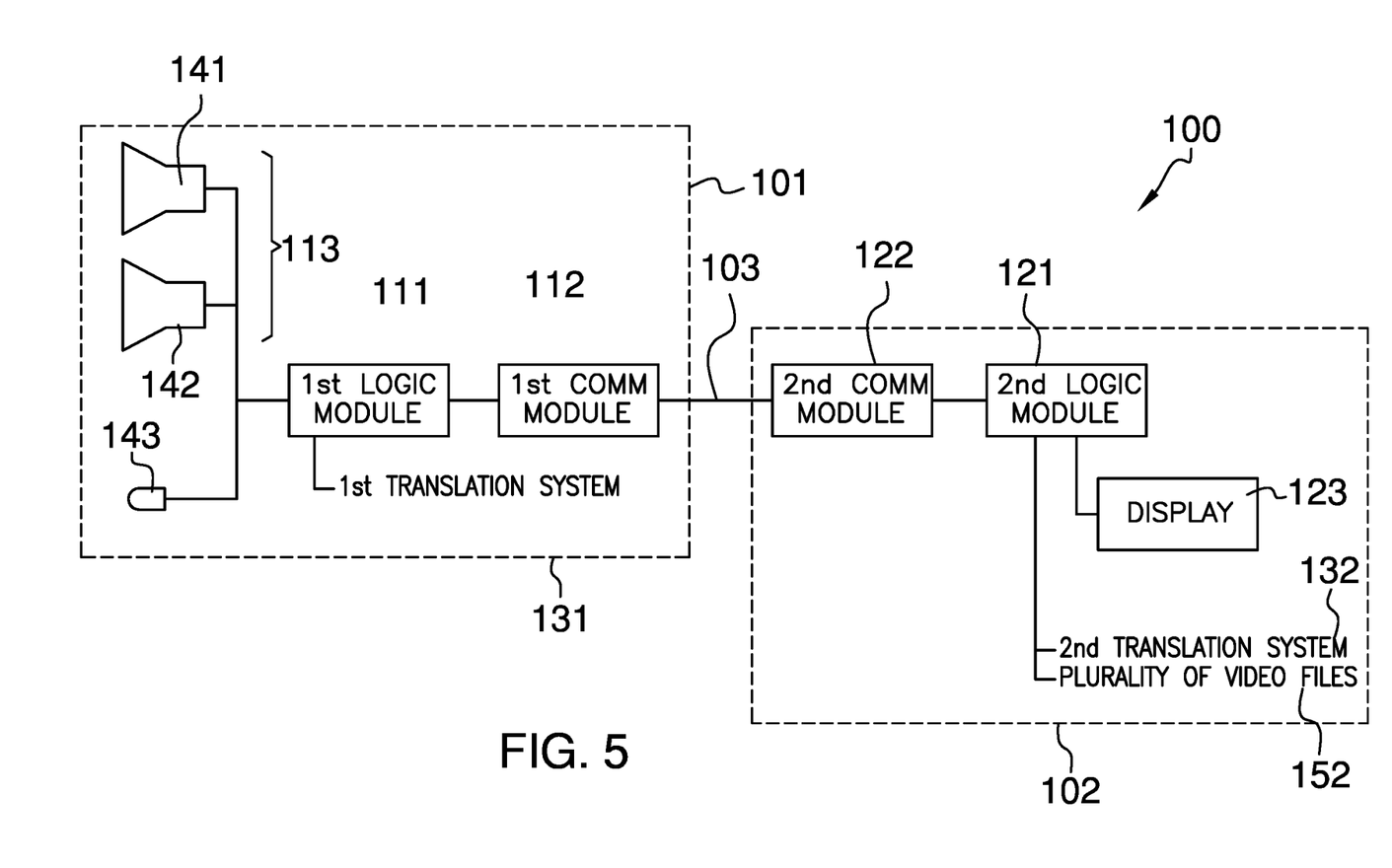
FIG. 5 is a block diagram of an embodiment of the disclosure.

The first logic module 111, the first communication module 112, the plurality of speakers 113, and the microphone 143 are electrically interconnected. The first housing 114 contains the first logic module 111, the first communication module 112, the plurality of speakers 113, and the microphone 143.

The first logic module 111 is a readily and commercially available programmable electronic device that is used to manage, regulate, and operate the headphones 101. Depending on the specific design and the selected components, the first logic module 111 can be a separate component within the headphones 101 or the functions of the first logic module 111 can be incorporated into another component within the headphones 101.

The first logic module 111 captures audible data associated with the first natural language through the microphone 143. The first logic module 111 translates the captured audible data associated with the first natural language into audible data associated with the second natural language using the first translation system 131. The first logic module 111 simultaneously announces the audible data associated with the first natural language and the audible data associated with the second natural language through a plurality of speakers 113. The first logic module 111 transmits the collected audible data associated with the first natural language over the communication link 103 to the personal data device 102. The first logic module 111 further comprises a first translation system 131.

The first translation system 131 is a logical device. The first logic module 111 controls the operation of the first translation system 131. The first translation system 131 receives the audible data associated with the first natural language collected by the first logic module 111 through the microphone 143. The first translation system 131 translates the captured audible data associated with the first natural language into audible data associated with the second natural language. The first translation system 131 transmits the translated audible data associated with the second natural language to the first logic module 111 for announcement. Devices suitable for use as the first translation system 131 are commercially available.

The first communication module 112 is a wireless electronic communication device that allows the first logic module 111 to wirelessly communicate with the locally presented personal data device 102. Specifically, the first communication module 112 establishes a communication link 103 between the headphones 101 and the personal data device 102. In the first potential embodiment of the disclosure, the first communication module 112 supports a communication protocol selected from the group consisting of a hardwire cable, a WiFi™ protocol, and a Bluetooth™ protocol.

Each of the plurality of speakers 113 is a transducer. The first logic module 111 controls the operation of each of the plurality of speakers 113. Each of the plurality of speakers announces data selected from the group consisting of the audible data associated with the first natural language and the audible data associated with the second natural language. The plurality of speakers 113 comprises a first speaker 141 and a second speaker 142.

The first speaker 141 is a transducer. The first logic module 111 controls the operation of the first speaker 141. The first speaker 141 receives an electrical signal from the first logic module 111. The first speaker 141 converts the received electrical signals into an audible sound. The second speaker 142 is a transducer. The first logic module 111 controls the operation of the second speaker 142. The second speaker 142 receives an electrical signal from the first logic module 111. The second speaker 142 converts the received electrical signals into an audible sound.

The first logic module 111 announces the audible data associated with the first natural language over the first speaker 141. The first logic module 111 announces the audible data associated with the second natural language over the second speaker 142.

The microphone 143 is a transducer. The first logic module 111 controls the operation of the microphone 143. The microphone 143 converts audible sounds detected in the vicinity of microphone 143 into electrical signals. The first logic module 111 collects the electrical signals generated microphone 143 to create the audible data associated with the first natural language.

The first housing 114 is a rigid structure. The first housing 114 contains the first logic module 111, the first communication module 112, the plurality of speakers 113, and the microphone 143. The first housing 114 is formed with all apertures and form factors necessary to allow the first housing 114 to accommodate the use, the operation, and the external connections of the first communication module 112, the plurality of speakers 113, and the microphone 143. Methods to form a first housing 114 suitable for the purposes described in this disclosure are well-known and documented in the mechanical arts.

The personal data device 102 is a programmable electrical device that provides data management and communication services through one or more functions referred to as an application. The application is a set of logical operating instructions that are performed by the personal data device 102. The addition of an application will provide increased functionality for the personal data device 102. This disclosure assumes that an application exists for the purpose of interacting with the headphones 101. Methods to design and implement an application on a personal data device 102 are well known and documented in the electrical arts.

The personal data device 102 receives the collected audible data associated with the first natural language. The personal data device 102 translates the captured audible data associated with the first natural language into an image 152 selected from a plurality of video files 151. The personal data device 102 visually displays the selected image 152. The personal data device 102 comprises a second logic module 121, a second communication module 122, an audio-visual display 123, and a second housing 124.

The second logic module 121, the second communication module 122, and the audio-visual display 123 are electrically interconnected. The second housing 124 contains the second logic module 121, the second communication module 122, and the audio-visual display 123.

The second logic module 121 is a readily and commercially available programmable electronic device that is used to manage, regulate, and operate the personal data device 102. Depending on the specific design and the selected components, the second logic module 121 can be a separate component within the personal data device 102 or the functions of the second logic module 121 can be incorporated into another component within the personal data device 102.

The second logic module 121 receives the collected audible data associated with the first natural language transmitted over the communication link 103 using the second communication module 122. The second logic module 121 translates the captured audible data associated with the first natural language into an image 152 selected from a plurality of video files 151. The second logic module 121 visually displays the selected image 152 using the audio-visual display 123. The second logic module 121 further comprises a second translation system 132 and a plurality of video files 151. Each of the plurality of video files 151 comprises an image 152.

The second translation system 132 is a logical device. The second logic module 121 controls the operation of the second translation system 132. The second translation system 132 receives the audible data associated with the first natural language collected by the first logic module 111 through the second logic module 121.

The plurality of video files 151 forms a library of images 152 that are accessed by the second logic module 121. Each of the plurality of video files 151 is an image of an indicia that represents a sentiment. The second logic module 121 selects each image 152 from the plurality of video files 151 such that an appropriate sentiment is associated with one or more words or phrases contained within the audible data associated with the second natural language. The image 152 is defined in greater detail elsewhere in this disclosure.

The second translation system 132 translates the captured audible data associated with the first natural language such that the second translation system 132 can provide to the second logic module 121 the data necessary to allow the second logic module 121 to select an appropriate image 152 from the plurality of video files 151. By appropriate is meant that the selected image 152 generates a sentiment for a native speaker of the second language that is appropriately associated with the captured audible data associated with the first natural language. Methods to associate images with text are well-known and documented in the language and psychological arts. Devices suitable for use as the second translation system 132 are commercially available.

The second communication module 122 is a wireless electronic communication device that allows the second logic module 121 to wirelessly communicate with the presented headphones 101. Specifically, the second communication module 122 establishes a communication link 103 between the headphones 101 and the personal data device 102. In the first potential embodiment of the disclosure, the second communication module 122 supports a communication protocol selected from the group consisting of a hardwire cable, a WiFi™ protocol, and a Bluetooth™ protocol.

The audio-visual display 123 is a commercially available electrical device. The second logic module 121 controls the operation of the audio-visual display 123. The second communication module 122 visually displays the image 152 using the audio-visual display 123. The audio-visual display 123 is selected such that the second logic module 121 can audibly announce audible data associated with the selected image 152.

The second housing 124 is a rigid structure. The second housing 124 contains the second logic module 121, the second communication module 122, and the audio-visual display 123. The second housing 124 is formed with all apertures and form factors necessary to allow the second housing 124 to accommodate the use, the operation, and the external connections of the second logic module 121, the second communication module 122, and the audio-visual display 123. Methods to form a second housing 124 suitable for the purposes described in this disclosure are well-known and documented in the mechanical arts.

The following definitions were used in this disclosure:

Announce: As used in this disclosure, to announce means to generate audible sounds over a speaker.

Application or App: As used in this disclosure, an application or app is a self-contained piece of software that is especially designed or downloaded for use with a personal data device.

Audio-Visual Display: As used in this disclosure, an audio-visual display is a display device that further comprises a speaker such that the audio-visual display simultaneously presents visual and audible information in a coordinated manner.

Bluetooth™: As used in this disclosure, Bluetooth™ is a standardized communication protocol that is used to wirelessly interconnect electronic devices.

Cable: As used in this disclosure, a cable is a collection of one or more insulated wires covered by a protective casing that is used for transmitting electricity or telecommunication signals.

Communication Link: As used in this disclosure, a communication link refers to the structured exchange of data between two objects.

Form Factor: As used in this disclosure, the term form factor refers to the size and shape of an object.

Hardwired: As used in this disclosure, the term hardwired refers to a physical electrical connection, generally using cable, between two electrical circuits or circuit elements. Such a hardwired connection is considered more reliable than a wireless connection.

Headphone: As used in this disclosure, a headphone is a device that comprises one or two earphones that are held to the ear, typically through the use of a band placed on top of the head. The headphone comprises one or more speakers and an optional microphone to allow for: 1) private access to an audio communication system; and, 2) hands-free access to an audio communication system. Headset is a synonym for headphone.

Housing: As used in this disclosure, a housing is a rigid structure that encloses and protects one or more devices.

Image: As used in this disclosure, an image is an optical representation or reproduction of an indicia or of the appearance of something or someone.

Indicia: As used in this disclosure, the term indicia refers to a set of markings that identify a sentiment. See sentiment.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Logical Device: As used in this disclosure, a logical device is a programmable electrical device that processes externally provided inputs to generate outputs that are determined from a previously programmed set of instructions.

Microphone: As used in this disclosure, a microphone is a transducer that converts the energy from vibration into electrical energy. The sources of vibrations include, but are not limited to, acoustic energy.

Natural Language: As used in this disclosure, a natural language refers to a language by individuals within a society to communicate directly with each other.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones. See logical device Rigid Structure: As used in this disclosure, a rigid structure is a solid structure formed from an inelastic material that resists changes in shape. A rigid structure will permanently deform as it fails under a force.

Speaker: As used in this disclosure, a speaker is an electrical transducer that converts an electrical signal into an audible sound.

Transducer: As used in this disclosure, a transducer is a device that converts a physical quantity, such as pressure or brightness into an electrical signal or a device that converts an electrical signal into a physical quantity.

Translate: As used in this disclosure, to translate means to convert data contained in a first organizational or operational structure into a second organizational or operational structure. The term translate often refers to the conversion of data existing in a first natural language into a second natural language.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A language translation device comprising:
   headphones, a personal data device, and a communication link;
   wherein the communication link exchanges data between the headphones and the personal data device;
   wherein the headphones capture audible data associated with a first natural language;
   wherein the headphones transmit the captured audible data associated with the first natural language to the personal data device;
   wherein the headphones translate the captured audible data associated with the first natural language into audible data associated with a second natural language;
   wherein the headphones simultaneously announce the captured audible data associated with the first natural language and the translated captured audible data associated with the second natural language.

2. The language translation device according to claim 1
   wherein the personal data device is a programmable electrical device;
   wherein the personal data device receives collected audible data associated with the first natural language;
   wherein the personal data device receives the captured audible data associated with the first natural language and translates the captured audible data associated with the first natural language into visual data associated with the second natural language;
   wherein the personal data device displays the visual data associated with the second natural language as an image of indicia that displays a sentiment associated with the visual data associated with the second natural language.

3. The language translation device according to claim 2
   wherein the headphones comprise a first logic module, a first communication module, a plurality of speakers, a microphone, and a first housing;
   wherein the first logic module, the first communication module, the plurality of speakers, and the microphone are electrically interconnected;
   wherein the first housing contains the first logic module, the first communication module, the plurality of speakers, and the microphone.

4. The language translation device according to claim 3 wherein the first housing is a rigid structure;
   wherein the personal data device comprises a second logic module, a second communication module, an audio-visual display, and a second housing;
   wherein the second logic module, the second communication module, and the audio-visual display are electrically interconnected;
   wherein the second housing contains the second logic module, the second communication module, and the audio-visual display.

5. The language translation device according to claim 4
   wherein the first logic module is a programmable electronic device;
   wherein the first logic module captures audible data associated with the first natural language through the microphone;
   wherein the first logic module translates the captured audible data associated with the first natural language into audible data associated with the second natural language using a first translation system;
   wherein the first logic module simultaneously announces the audible data associated with the first natural language and the audible data associated with the second natural language through a plurality of speakers;

wherein the first logic module transmits the collected audible data associated with the first natural language over the communication link to the personal data device.

6. The language translation device according to claim 5 wherein the first logic module further comprises a first translation system;
wherein the first translation system is a logical device;
wherein the first logic module controls an operation of the first translation system.

7. The language translation device according to claim 6 wherein the first translation system receives the audible data associated with the first natural language collected by the first logic module through the microphone;
wherein the first translation system translates the captured audible data associated with the first natural language into audible data associated with the second natural language;
wherein the first translation system transmits the translated audible data associated with the second natural language to the first logic module.

8. The language translation device according to claim 7 wherein specifically, the first communication module establishes a communication link between the headphones and the personal data device.

9. The language translation device according to claim 8 wherein each of the plurality of speakers is a transducer;
wherein the first logic module controls an operation of each of the plurality of speakers;
wherein each of the plurality of speakers announces data selected from the group consisting of the audible data associated with the first natural language and the audible data associated with the second natural language.

10. The language translation device according to claim 9 wherein the microphone is a transducer;
wherein the first logic module controls an operation of the microphone;
wherein the microphone converts detected audible sounds into electrical signals;
wherein the first logic module collects the electrical signals generated microphone to create the audible data associated with the first natural language.

11. The language translation device according to claim 10 wherein the second logic module is a programmable electronic device;
wherein the second logic module receives the collected audible data associated with the first natural language transmitted over the communication link using the second communication module;
wherein the second logic module translates the captured audible data associated with the first natural language into an image selected from a plurality of video files;
wherein the second logic module visually displays the selected image using the audio-visual display.

12. The language translation device according to claim 11 wherein the second logic module further comprises a second translation system;
wherein each of the plurality of video files comprises an image;
wherein the second translation system is a logical device;
wherein the second logic module controls an operation of the second translation system;
wherein the second translation system receives the audible data associated with the first natural language.

13. The language translation device according to claim 12 wherein the second logic module further comprises a plurality of video files;
wherein the plurality of video files forms a library of images that are accessed by the second logic module;
wherein each of the plurality of video files is an image of an indicia that represents a sentiment;
wherein the second logic module selects each image from the plurality of video files such that an appropriate sentiment is associated with one or more words or phrases contained within the audible data associated with the second natural language.

14. The language translation device according to claim 13 wherein the second translation system translates the captured audible data associated with the first natural language such that the second translation system can provide to the second logic module the data necessary to allow the second logic module to select an appropriate image from the plurality of video files;
wherein by appropriate is meant that the selected image generates a sentiment for a native speaker of the second language that is appropriately associated with the captured audible data associated with the first natural language.

15. The language translation device according to claim 14 wherein the second communication module establishes the communication link between the headphones and the personal data device.

16. The language translation device according to claim 15 wherein the audio-visual display is an electrical device;
wherein the second logic module controls an operation of the audio-visual display;
wherein the second communication module visually displays the image using the audio-visual display;
wherein the audio-visual display is selected such that the second logic module can audibly announce audible data associated with the selected image.

17. The language translation device according to claim 16 wherein the second housing is a rigid structure.

18. The language translation device according to claim 17 wherein the plurality of speakers comprises a first speaker and a second speaker;
wherein the first speaker is a transducer;
wherein the first logic module controls an operation of the first speaker;
wherein the first speaker receives an electrical signal from the first logic module;
wherein the first speaker converts the received electrical signals into an audible sound;
wherein the second speaker is a transducer;
wherein the first logic module controls an operation of the second speaker;
wherein the second speaker receives an electrical signal from the first logic module;
wherein the second speaker converts the received electrical signals into an audible sound.

19. The language translation device according to claim 18 wherein the first logic module announces the audible data associated with the first natural language over the first speaker;
wherein the first logic module announces the audible data associated with the second natural language over the second speaker.

* * * * *